Patented Dec. 14, 1943

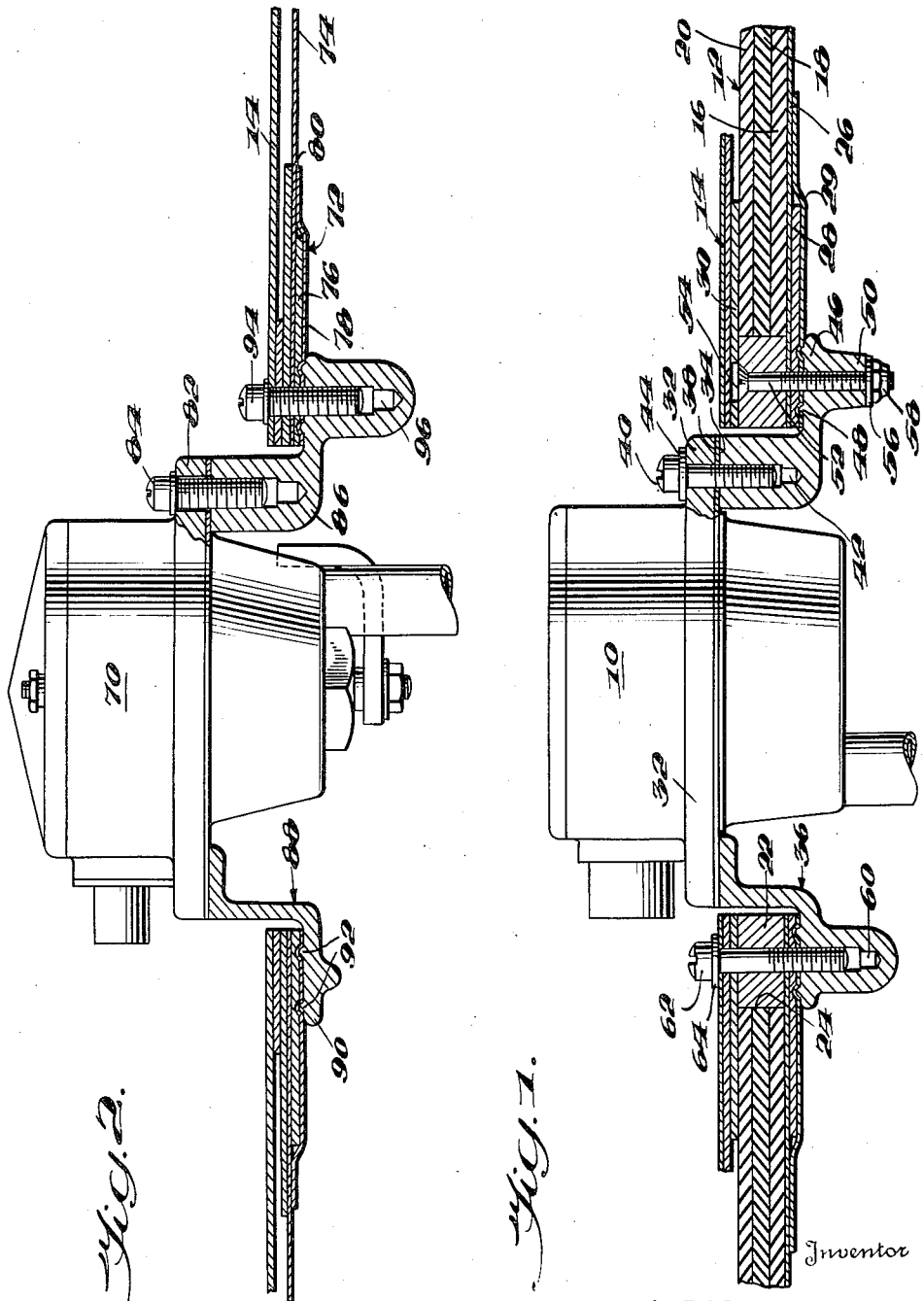

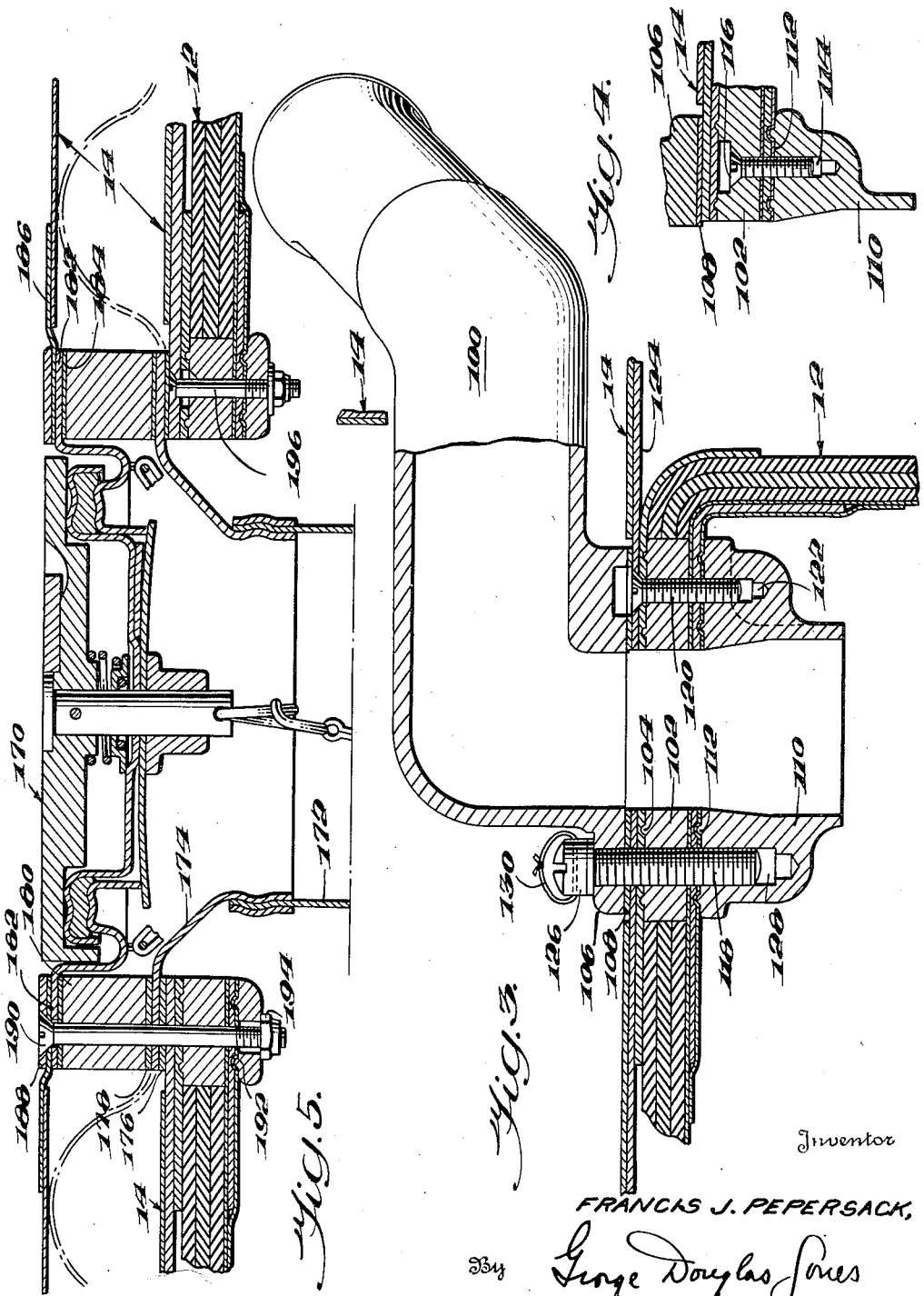

2,336,885

UNITED STATES PATENT OFFICE 2,336,885

FITTING CONSTRUCTION FOR TANKS

Francis J. Pepersack, Towson, Md., assignor to The Glenn L. Martin Company, Middle River, Md., a corporation of Maryland Application July 18, 1942, Serial No. 451,476

3 Claims. (Cl. 285—25)

The present invention pertains to a fitting construction for tanks and, more particularly, to one for tanks adapted to contain liquid hydrocarbons and comprising a rubber-like cell within a rigid housing structure.

Tanks of this nature have been found useful as fuel and oil tanks for airplanes, in which case they are fitted into the different parts of an aircraft fuselage or wing so that the normal structure provides the rigid confining element of the tank. For an example of this practice, reference may be had to Gray et al. Patent No. 2,102,590 disclosing a cellular form of tank applied to aircraft construction.

It is to be distinctly understood that the cellular form of tank under consideration is likewise adaptable to all kinds of transport vehicles and especially to ships and barges.

In a co-pending application Serial No. 423,646, filed December 19, 1941, now Patent No. 2,321,417, granted June 8, 1943, in the name of the present inventor, there is disclosed and claimed broadly a tank construction involving a cell of rubber-like material subject to cold flow under pressure and provided with a rigid ring about a fitting opening adapted to prevent pressure and deleterious cold flow when clamped to the rigid housing structure by an appropriate fitting. This previously filed application also contains disclosure and claims to certain forms of tank fittings adapted for use with a cellular tank provided with a rigid ring and, also, to cellular tanks not employing this feature. The invention to be disclosed in detail herein represents specific improvements in the manner of attaching a tank fitting to a rigid housing structure and to a cellular tank reinforced about its opening with the non-resilient ring characterizing the earlier application. Specifically novel forms of special fittings for use with cellular tanks will also be disclosed and claimed.

One of the principal objects of this invention is to provide a rigid ring about the fitting opening in a rubber-like tank cell with a plurality of openings for receiving threaded members so that a clamping flange member may be secured on the inner side of the cell about its opening independently and outwardly of the tank fitting which extends into this opening. For convenience in assembly, it is also intended to provide an arrangement of the threaded attaching members such that some may be employed for attaching the flange member to the tank cell only while others will perform a hanging function by securing the flange member to the rigid housing structure as well as the tank cell.

An additional object of the invention resides in the provision of a clamping flange member, such as previously indicated, with a portion extending outwardly into or through the tank opening for supporting the fitting or device so that the latter may be attached to this flange portion by screws or the like inserted from without the tank construction.

It is a specific object of the invention to provide efficient means for mounting fittings or devices such as liquid level gages, fillers and tank outlets, to a tank construction which is incorporated in an aircraft.

Other features of novelty contributing to the simplicity of the tank construction, the attachment of the fittings or devices and the efficiency of such fittings or devices in use will be pointed out in connection with the following detailed description of several illustrative embodiments of the invention taken in connection with the accompanying drawings, in which Fig. 1 is a fragmentary view partly in vertical section of a tank construction having a fitting in the form of a liquid level meter mounted thereon;

Fig. 2 is a similar view showing a variation of the liquid meter fitting and the tank cell to which it is connected;

Fig. 3 is a side elevation partially sectioned illustrating a front outlet fitting applied to the form of cellular tank represented by Fig. 1;

Fig. 4 is a fragmentary vertical section showing an attaching detail of Fig. 3;

Fig. 5 is a vertical section illustrating a different form of tank filler connected in a special manner to the type of rigid structure and tank cell shown in Fig. 1.

Referring to Fig. 1, a standard form of meter or liquid level gage 10 is shown in association with a tank cell 12 enclosed by a rigid housing structure indicated generally as 14.

The tank cell 12 is of the self-sealing variety and includes an inner sealant layer 16, an intermediate sealant layer 18, and an outer sealant layer 20 comprising a three-ply lamination subject to cold flow under pressure. In particular, the inner layer 26 will preferably be of a synthetic rubber such as that known commercially as neoprene, or any equivalent material having resistance to attack by liquid hydrocarbon fuels. Crude unvulcanized rubber is used for the intermediate layer 18 in order to provide a sealing action and prevent leakage following bullet penetration. The outer layer 20 which is adjacent the housing structure 14 is by preference formed of soft vulcanized rubber. These three layers which are adhesively bonded after suitable surface treatment comprise the subject-matter of Gray and De Weese patent application Serial No. 338,052, filed May 31, 1940, which construction will be described in further detail in connection with the present invention.

Particular note is to be made of a rigid ring or tubing 22 closely fitted within a cell opening 24 defined by the cell layers 16, 18 and 20, and having the total thickness of these layers in unstressed condition. The non-resilient or rigid ring 22 is preferably formed from a phenolic condensate material such as Bakelite, or from molded fiber, and has the important function of preventing cold flow of the cell layers about the opening. The tank cell 12 also includes an inner reinforcing lining 26 of a material which is unaffected by liquid hydrocarbon fuels, adhesively bonded in place and overlapping the underside of the ring 22. An inner reinforcing member 28 of washer shape and a somewhat thinner seam cover 29 also underlie the ring 22 and extend about the cell opening. The lining, reinforcing members and seam cover will be of fabric impregnated with a rubber-like composition. An outer reinforcing member 30 surrounds the cell opening, covers the ring 22, and overlaps the outer surface of the tank cell 12. It will be further understood that the various fabric layers reinforcing the cell opening are adhesively secured to each other or the tank cell 12.

The device 10 has an attaching flange 32 extending around its bottom and resting upon a tubular or upper flange portion 34 of a shouldered metallic ring 36, the joint being sealed by a conventional gasket 38. A circumferentially spaced series of screws 40 extend through the attaching flange 32 each into a respective tapped boss 42 forming a part of the tubular flange portion 34 which extends through the opening of the tank cell 12. Washers 44 are employed beneath the heads of the screws 40.

It will be observed that the shouldered ring 36 includes an inwardly disposed flange member 46 approximately co-extensive in width with the rigid ring 22 which it underlies and being provided with ridges 48 for clamping the tank cell 12. At suitable spacing the flange member 46 is provided with bosses, such as the drilled one 50, for receiving threaded means in the form of a bolt or screw 52 passing downwardly through the ring 22 and having its head 54 countersunk therein. A washer 56 and a stop nut 58 on the inner end of the bolt 52 secure the tank cell 12 to the flange member 46 independently of the housing structure 14. By such means, the tank cell 12 and internal flange member 46 may first be secured together prior to attachment of the device 10.

At other circumferential points blind tapped bosses, such as 60, will be formed beneath the flange member 46 for receiving individual screws 62 each having a washer 64 beneath its head and extending through the rigid housing structure 14 as well as the rigid ring 22 of the tank cell and into threaded engagement with the flange member 46 for securing all of these parts together and the level gage or device 10 thereto.

The embodiment of the invention shown in Fig. 2 is quite similar to the one previously described in that it includes a liquid meter 70 joined to the housing structure 14 and a tank cell 72, the latter being modified in some particulars now to be noted.

In this instance, the pliant tank cell 72 is composed of a relatively thin wall layer 74 of synthetic rubber, such as neoprene or any material which is unaffected by liquid hydrocarbon fuels, and reinforced about the vent opening by an inner reinforcement layer 76 resembling a large washer and preferably formed from a heavy fabric impregnated with neoprene or equivalent hydrocarbon resistant material. As in the cell construction of Fig. 1, this reinforcement member 76 has its seam covered and inner surface sealed by a layer 78, preferably of balloon cloth fabric impregnated with neoprene or the like and adhesively attached. An outer reinforcing member 80 similar in all respects to the inner member 76 but of somewhat larger outside diameter is adhesively secured to the cell wall 74 and completes the reinforcement of its opening.

In view of the substantial identity of the fitting in this embodiment, only brief reference will be made to its essential details. The liquid meter 70 is provided with a circular attaching flange 82 through which pass a circumferentially spaced series of attaching screws 84 threaded into underlying tapped bosses 86 at the outer or upper end of a shouldered and flanged ring 88 extending through the housing structure 14 and the tank cell 74. As in the embodiment which has been described, the tubular portion of the ring 88 is terminated by an outwardly extending flange 90, ridged at 92 and underlying the surface surrounding the opening of the tank cell 72.

Clamping engagement between the rigid housing structure 14, the reinforcing portion of the tank cell 72 and the flange 90 of ring 88 is accomplished by means of an additional circumferentially spaced series of inwardly extending screws 94 threadedly engaging corresponding blind tapped bosses 96 after passing through the rigid structure 14 and the tank cell 72.

For purposes of assembly, the shouldered ring 88 may be extended outwardly through the opening of the tank cell 72 and secured thereto by means of the screws 94 engaging its inner flange 90 prior to attachment of the flange 82 of the meter or device 70 to the upper end or flange of the ring 88.

In Fig. 3, a front outlet fitting 100 for the tank cell 12 illustrates a further application of the principles of this invention to the self-sealing, multiple layer type of cell.

In the manner previously described, a non-resilient ring 102 of tubular shape and having ridges 104 on its upper surface is inserted snugly within the opening of the tank cell 12 and has the total thickness of the layers of that cell in unstressed condition. A circular flange 106 on the outlet fitting or device 100, is sealed by a circular gasket 108 interposed between it and the inner layer of the rigid housing structure 14 with which it is in face-to-face relation. A tubular member 110 forming a continuation of the aligned portion of the outlet 100 is disposed within the tank cell 12 and formed to provide a flange member 112 ridged and substantially co-extensive with the rigid ring 102.

Referring to Fig. 4, a suitably spaced series of blind tapped bosses 114 are formed on the underside of the flange member 112 to receive a corresponding series of headed screws 116 which are countersunk in the upper portion of the rigid ring 102 and thus afford the initial securing means for clamping the ring 102 and its attached tank cell 12 to the tubular member 110.

Two other sets of attaching screws 118 and 120 are employed in assembling and securing the various parts of the fitting and tank together. The screws or threaded members 120, of which one is shown on the right side of Fig. 3, engage blind tapped bosses 122 and have their heads countersunk, as shown, in the inner layer 124 of the rigid housing 14, thus serving as a hangar supporting the tank cell 12 and attached tubular member 110 within the housing structure 14 before the outlet fitting or device 100 is in place.

At the left of Fig. 3 it will be observed that the heads 126 of the largest threaded members 118 are tightened down upon the upper face of the flange 106 by reason of threaded engagement between the screws 118 and blind tapped bosses 128 formed on the tubular member 110. The heads 126 of the screws 118 have a wire 130 laced therethrough and extending between all of the heads so that none of the screws can come loose. When the screws 118 are in place, the ring portion of the tank cell 12 will be securely clamped between the flanges 106 and 112.

While Fig. 5 shows another form of tank filler designated generally as 170, applied to the multiple layer form of tank cell 12, this modification of the invention includes also special features which will now be described. The filling device 170 comprises a cylindrical screen 172 within the inside of tank cell 12 and in alignment with its opening, which screen is supported by an outwardly extending attaching flange 174 overlying the rigid housing structure 14 about the tank opening, and having sealing gaskets 176 and 178 on its respective faces. The gasket 178 is co-extensive with and underlies a rigid spacer ring 180 having its inner periphery aligned with that of the non-resilient ring defining the opening in tank cell 12. Both rings will preferably be formed of a phenolic condensation product. On its upper side the spacer ring 180 supports another attaching flange 182 forming with flange 174 a spaced parallel pair. The underface of flange 182 is sealed by a gasket 184 and the upper face of 182 is covered by a circular sealing patch 186 of neoprene or equivalent material sealed to a spaced portion of the housing structure 14, as shown. A metallic ring 188 is suitably drilled at spaced points to receive a series of bolts 190 having their heads countersunk therein and extending through both non-resilient rings, the intervening flanges 174 and 182 and an inner ridged flange member 192. Stop nuts 194 engage the inner flange member 192 and retain this assembly in its clamped relation.

For preliminary mounting purposes, an intermediate spaced series of bolts 196 are passed through the inner part of the rigid housing 14 and through the tank cell and the inner flange member 192 so as to support the tank cell 12 on the housing structure while the fitting 170 is being attached thereto by means of the bolts 190.

The foregoing detailed description of several preferred embodiments of the invention serves to demonstrate its advantages in attaching various forms of fitting devices to cellular tanks and their rigid confining structures when the tank opening must be free from restriction by the attaching means.

The term "ring" as used in the specification and the appended claims with respect to the member defining the tank cell opening or the spacer member of Fig. 5 is intended to mean any form of continuous or annulus member of round, rectangular, or other shape such as may be dictated by the dimensions of the space available and the nature of the device to be attached.

It will be apparent from the embodiments of the invention which have been described that changes may be made in the details of construction and arrangement of parts without departing from the spirit of the invention and the scope of the appended claims.

Having thus described the invention, what I claim as new and desire to secure by Letters Patent of the United States is:

1. A fitting construction for liquid fuel or lubricant tanks comprising a tank cell formed of one or more layers of rubber-like material subject to cold flow and having an opening through the wall thereof; a ring of non-resilient material having the total thickness of the cell material in uncompressed condition and fitted within the opening of said cell and having a plurality of holes formed therein; sealing layers secured to the inner and outer sides of the tank cell about its opening and arranged to cover the abutment lines between said ring and said cell; a rigid structure confining said tank cell and provided with an opening in alignment with that of the tank cell; a flange member underlying the non-resilient ring on the inside of the tank cell; and a plurality of threaded fasteners extending through the rigid structure and through said holes in the non-resilient ring to engage the flange member to secure said flange member to the tank cell and the rigid structure.

2. A fitting construction for liquid fuel or lubricant tanks comprising a tank cell formed of one or more layers of rubber-like material subject to cold flow and having an opening through the wall thereof; a ring of non-resilient material having the total thickness of the cell material in uncompressed condition and fitted within the opening of said cell and having a plurality of holes formed therein; sealing layers secured to the inner and outer sides of the tank cell about its opening and arranged to cover the abutment lines between said ring and said cell; a rigid structure confining said tank cell and provided with an opening in alignment with that of the tank cell; a flange member underlying the non-resilient ring on the inside of the tank cell, said flange member having a tubular portion extending outwardly into the opening of the tank cell; a device having an attaching flange engaging said tubular portion; a plurality of threaded fasteners extending through the rigid structure and through the non-resilient ring and engaging the flange member to secure said flange member to the tank cell and the rigid structure; and screws securing the attaching flange of the device to said tubular portion.

3. A fitting construction for liquid fuel or lubricant tanks comprising a tank cell formed of one or more layers of rubber-like material subject to cold flow and having an opening through the wall thereof; a ring of non-resilient material having the total thickness of the cell material in uncompressed condition and fitted within the opening of said cell and having a plurality of holes formed therein; sealing layers secured to the inner and outer sides of the tank cell about its opening and arranged to cover the abutment lines between said ring and said cell; a rigid structure confining said tank cell and provided with an opening in alignment with that of the tank cell; a flange member underlying the non-resilient ring on the inside of the tank cell; threaded means extending through the rigid structure and the holes in the non-resilient ring and engaging the flange member to secure said flange member to the tank cell and the rigid structure; and a device having an attaching flange extending in face-to-face relation with the rigid structure about its opening; and additional threaded means extending through the attaching flange, the rigid structure, the non-resilient ring, and into the flange member.

FRANCIS J. PEPERSACK.